Patented Mar. 12, 1935

1,994,033

UNITED STATES PATENT OFFICE 1,994,033

VAT DYESTUFF OF THE ANTHRAQUINONE ACRIDONE SERIES

Robert Berliner, Leverkusen, near Cologne-on-the-Rhine, Germany, assignor to General Aniline Works inc., New York, N. Y., a corporation of Delaware No Drawing. Application May 1, 1929, Serial No. 359,724. In Germany May 8, 1928

4 Claims. (Cl. 260—37)

The present invention relates to a process of manufacturing vat dyestuffs of the anthraquinone series and to the new products obtainable thereby.

It is known that halogenated anthraquinone-acridones, containing 3 or more halogenatoms in the molecule, will split off halogenatoms when treated with organic or inorganic bases or salts of weak acids in the presence of copper or copper compounds (see for example German Patent No. 263,078).

I have found, that when working in the same or a similar manner but in the presence of alpha-aminoanthraquinone compound, which may be substituted in the nucleus by a carbocyclic aroyl-amino- or alkoxy group no splitting off of halogenatoms but a condensation reaction between the halogenated anthraquinone-acridone and the aminoanthraquinone occurs.

I prefer to perform the reaction by starting with a halogenated anthraquinone-acridone of the formula

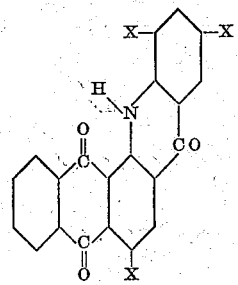

wherein the three X's stand for halogenatoms more particularly for bromo- or chloroatoms, obtainable for instance by brominating or chlorinating the corresponding anthraquinoneacridone according to known methods, and reacting upon this starting material with the alpha-aminoanthraquinone, in the presence of a suitable high boiling organic solvent and an acid binding medium at temperatures between about 180° C. and the boiling point of the reaction mixture. As suitable high boiling organic solvents nitrobenzene, naphthalene, trichlorobenzene or the like may be mentioned by way of example, whereas as acid binding media sodium acetate, potassium-carbonate, sodium carbonate and the like will be suitable ones. In some cases it will be advantageous to add to the reaction mixture a small amount of copper or a suitable copper salt, such as copper chloride, copper bromide cuprous bromide, copper acetate and the like in order to accelerate the reaction.

My new compounds, thus obtainable, are formed according to the following equation:

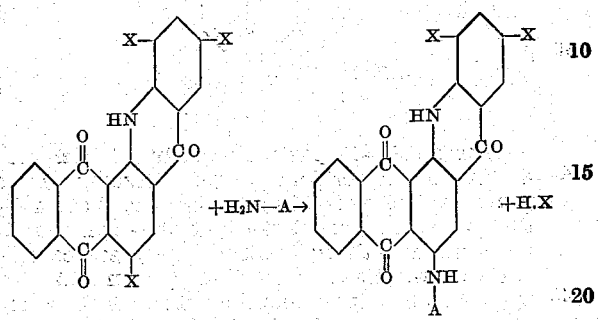

wherein the two X's stand for halogenatoms and A means the anthraquinone nucleus attached to the nitrogen atom in alpha-position, which nucleus may be substituted by a carbocyclic aroyl-amino- or alkoxy group. They form dark colored crystalline powders, nearly insoluble in the usual organic solvents, soluble in strong sulfuric acid with yellow to brown colorations, and they dye cotton from an alkaline hydrosulfite vat strong dark shades of good fastness properties.

The following examples illustrate my invention, without limiting it thereto:—

*Example 1.*—10 parts by weight of trichloro-anthraquinone acridone of the formula

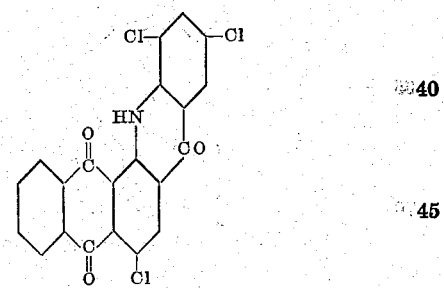

obtainable, for example, in accordance with the German Patent No. 258,561, Example 4, are heated to boiling for some hours in 100 parts by weight of naphthalene with 3 parts by weight of 1-benzoylamino-5-aminoanthraquinone and 2.5 parts by weight of sodium acetate with the addition of 0.2 part by weight of cupric chloride until there is no further increase in the quantity of the condensation product, which separates in small greyish green needles. The melt is worked up in the customary manner, if desired or necessary with the addition of a diluent. The greyish green crystalline powder obtained dissolves in concentrated sulfuric acid with a yellowish brown coloration. The product dyes cotton from an alkaline hydrosulfite vat strong gray shades of good fastness properties. It corresponds to the formula:

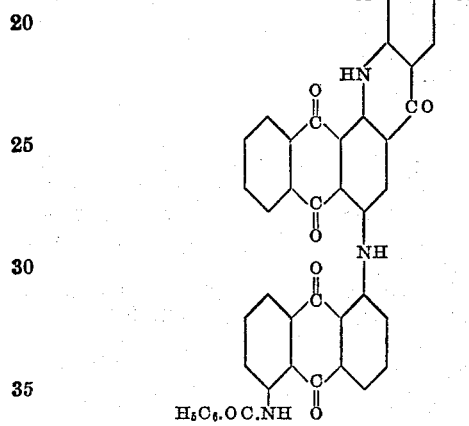

*Example 2.*—10 parts by weight of trichloroanthraquinone acridone as used in Example 1 are heated to boiling in 200 parts by weight of naphthalene with 8 parts by weight of 1-benzoylamiino-4-aminoanthraquinone in the presence of 4 parts by weight of sodium acetate and 0.2 part by weight of cupric chloride. The condensation product separates in the form of dark crystals and is worked up as described in Example 1. It dissolves in strong sulfuric acid with a yellowish olive coloration and dyes cotton from an alkaline hydrosulfite vat strong grey shades. It corresponds to the formula:

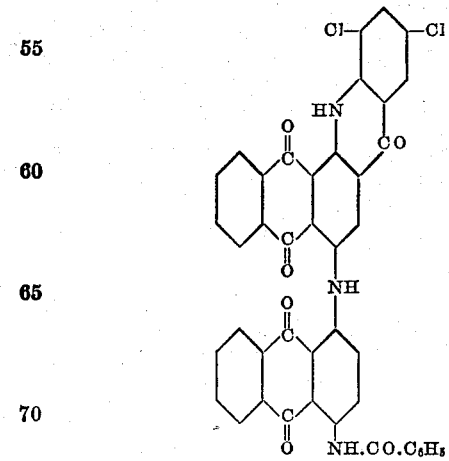

*Example 3.*—5 parts by weight of trichloroanthraquinone acridone as used in Example 1 are heated to boiling for some hours in 100 parts by weight of naphthalene with 3 parts by weight of α-aminoanthraquinone, 2 parts by weight of sodium acetate and 0.1 part by weight of cupric chloride. The condensation product separates in the form of dark crystals, which dissolve in concentrated sulfuric acid with a yellowish brown coloration. The product, which dyes cotton from an alkaline hydrosulfite vat greyish shades, corresponds to the formula:

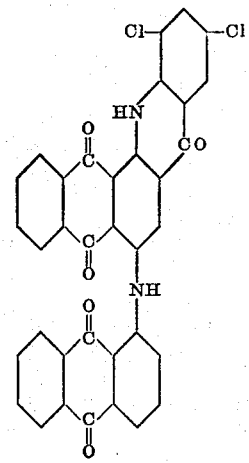

*Example 4.*—20 parts by weight of the trichloroanthraquinone acridone of Example 1, 12 parts by weight of 1-amino-4-methoxy anthraquinone, 200 parts by weight of naphthalene, 5 parts by weight of sodium acetate and 0.5 part by weight of cupric chloride are heated to boiling until there is no further increase in the quantity of the condensation product, which separates in form of a dark crystal powder. The new compound, which corresponds to the formula:

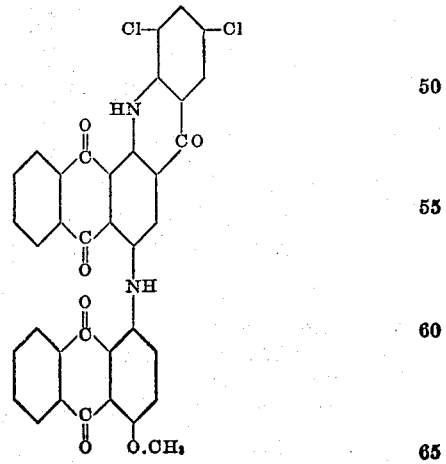

dissolves in concentrated sulfuric acid with a blueish green coloration. On pouring into water corinth colored flakes are obtained. The product dyes cotton from an alkaline hydrosulfite vat strong corinth shades.

In the following claims the term "copper catalyst" is intended to comprise copper and copper compounds, particularly its salts.

I claim:—
1. As a new compound, the vat dyestuff of the formula:

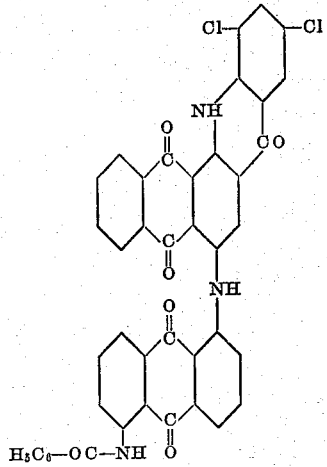

said compound being a greyish green crystalline powder, dissolving in concentrated sulfuric acid with a yellowish brown coloration, and dyeing cotton from an alkaline hydrosulfite vat strong gray shades of good fastness properties.

2. As a new compound, the vat dyestuff of the formula:

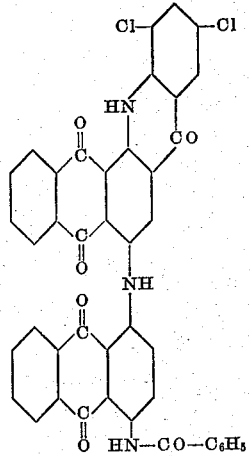

said compound being a dark crystalline powder, dissolving in strong sulfuric acid with a yellowish olive coloration, and dyeing cotton from an alkaline hydrosulfite vat strong grey shades.

3. The product of the general formula

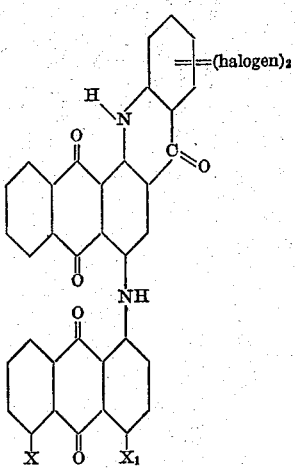

wherein $X_1$ stands for methoxy and $X$ stands for hydrogen or either $X$ or $X_1$ stands for benzoylamino while the other stands for hydrogen said products being dark crystalline powders nearly insoluble in the usual organic solvents, soluble in strong sulfuric acid, with yellow to brown colorations, dyeing cotton from an alkaline hydrosulfite vat strong dark shades of good fastness properties.

4. The products of the general formula wherein either $X$ or $X_1$ is benzoyl amino, the other being hydrogen, said products being dark, crystalline powders nearly insoluble in the usual organic solvents, soluble in strong sulfuric acid, with yellow to brown colorations, dyeing cotton from an alkaline hydrosulfite vat strong dark shades of good fastness properties.

ROBERT BERLINER. [L. S.]